United States Patent
Marchini et al.

(10) Patent No.: US 8,778,111 B2
(45) Date of Patent: Jul. 15, 2014

(54) PROCESS FOR MANUFACTURING A TYRE, AND TYRE OBTAINED THEREFROM

(75) Inventors: Maurizio Marchini, Milan (IT); Ezio Musitelli, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 308 days.

(21) Appl. No.: 13/139,691

(22) PCT Filed: Dec. 15, 2008

(86) PCT No.: PCT/IB2008/055291
§ 371 (c)(1),
(2), (4) Date: Jun. 14, 2011

(87) PCT Pub. No.: WO2010/070381
PCT Pub. Date: Jun. 24, 2010

(65) Prior Publication Data
US 2011/0247741 A1    Oct. 13, 2011

(51) Int. Cl.
*B29D 30/20* (2006.01)
*B29D 30/30* (2006.01)
*B60C 5/14* (2006.01)

(52) U.S. Cl.
USPC ......... 156/123; 156/110.1; 156/131; 152/510

(58) Field of Classification Search
USPC ........ 156/414–420, 110.1, 123; 152/510–512
See application file for complete search history.

(56) References Cited

U.S. PATENT DOCUMENTS

| | | | |
|---|---|---|---|
| 5,029,627 A | | 7/1991 | Ochiai |
| 6,123,132 A | * | 9/2000 | Appleton ...................... 152/458 |
| 6,328,084 B1 | | 12/2001 | Caretta et al. |
| 6,398,893 B1 | | 6/2002 | Shida |
| 2004/0112496 A1 | | 6/2004 | Domenico Colantonio et al. |
| 2004/0123927 A1 | | 7/2004 | Ueyoko et al. |
| 2006/0016539 A1 | | 1/2006 | Colantonio et al. |
| 2007/0044884 A1 | * | 3/2007 | Nishitani ...................... 152/510 |
| 2007/0113944 A1 | | 5/2007 | Ueyoko et al. |

FOREIGN PATENT DOCUMENTS

| | | | |
|---|---|---|---|
| DE | 973 080 | | 11/1959 |
| DE | 3908502 | * | 9/1990 |
| EP | 0 342 867 A2 | | 11/1989 |

(Continued)

OTHER PUBLICATIONS

International Search Report from the European Patent Office for International Application No. PCT/IB2008/055291 (Mail date: Aug. 31, 2009).

(Continued)

*Primary Examiner* — Justin Fischer
(74) *Attorney, Agent, or Firm* — Finnegan, Henderson, Farabow, Garrett & Dunner, L.L.P.

(57) ABSTRACT

During building of a carcass structure, a liner is applied around an outer surface of a primary drum by: circumferentially winding at least one pair of sheets of elastomeric material around an outer surface of the primary drum, which sheets are axially spaced apart from each other so as to form respective axially external portions of the liner; laying at least one continuous elongated element of elastomeric material in the form of a plurality of mutually approached coils around the outer surface of the primary drum in order to form a central portion of the liner having axially external edges that are each associated with an axially internal edge of one of said axially external portions of the liner.

35 Claims, 3 Drawing Sheets

(56) References Cited

FOREIGN PATENT DOCUMENTS

| EP | 1 044 791 A2 | 10/2000 |
| EP | 1 350 639 A1 | 10/2003 |
| EP | 1 428 691 A1 | 6/2004 |
| EP | 1 970 221 A1 | 9/2008 |
| JP | 2005-153348 | 6/2005 |
| WO | WO-2008/099236 A1 | 8/2008 |
| WO | WO 2008/129363 * | 10/2008 |

OTHER PUBLICATIONS

International Preliminary Report on Patentability for International Application No. PCT/IB2008/055291 dated Jun. 21, 2011 (7 pages).

* cited by examiner

FIG 1

PROCESS FOR MANUFACTURING A TYRE, AND TYRE OBTAINED THEREFROM

CROSS REFERENCE TO RELATED APPLICATION

This application is a national phase application based on PCT/IB2008/055291, filed Dec. 15, 2008, the content of which is incorporated herein by reference.

BACKGROUND OF THE INVENTION

1. Field of the Invention

The present invention relates to a process for manufacturing a tyre for vehicle wheels. In a further aspect, the invention relates to a tyre for vehicle wheels obtained through said process.

In more detail, the present invention relates to the manufacture of a substantially airtight coating layer, typically referred to as "liner" that is usually provided on the radially internal surface of a tyre of the "tubeless" type, i.e. a tyre in which an air tube is not present, to ensure hermetic seal to the inflating gases of the tyre under use conditions.

2. Description of the Related Art

In traditional building processes, in which the tyre is obtained through assembly of semifinished products on a building drum, the liner is usually formed by winding up a sheet of raw elastomeric material around the outer surface of the building drum, which sheet extends over the whole width of a carcass sleeve subsequently formed following application of the carcass ply/plies and of the annular anchoring structures engaged to the end flaps of the carcass ply/plies.

There are also building processes in which the tyre components are made by laying a plurality of elementary components on a forming drum so as to avoid the need for intermediate steps in order to work and store the semifinished products.

In the present context by "elementary components" it is intended continuous elongated elements of elastomeric material, strip-like elements, i.e. ribbon-like elements of elastomeric material cut to size and reinforced with at least two textile or metallic cords parallel to each other in the longitudinal direction of the element itself, rubberised textile or metallic cords.

Here and in the following of the present specification, by low-section tyre it is intended a tyre having a reduced section ratio, i.e. wherein the section height measured between the radially outermost point of the crown structure and the radially innermost point of the bead, is lower than about 50% of the section width axially measured at the point of maximum chord of the tyre. More specifically, the low-section tyres taken into account in the present context are those in which the section height is included between about 20% and about 50% of the section width.

Document WO 2008/099236 in the name of the same Applicant illustrates manufacture of the liner by spiralling, i.e. through dispensing of at least one continuous elongated element of elastomeric material on the outer surface of a substantially cylindrical building drum driven in rotation around its geometric axis so as to determine laying of the continuous elongated element into a plurality of coils disposed close to each other and/or in superposed relationship in order to generate a continuous layer on said outer surface. Then a radial expansion is imposed to the carcass structure made in a cylindrical conformation on the building drum, so as to give it a toroidal conformation for coupling to an outer ring previously positioned around it.

Document JP 2005-153348 illustrates manufacture of the liner through winding of a sheet of elastomeric material with a constant thickness around the outer surface of a cylindrical drum, which sheet has been obtained beforehand by calendering, and cut to size according to the circumferential extension of the drum itself. Disposed in the continuation of the axially opposite ends of the central portion are two axially external portions obtained by spiralling of a continuous elongated element of elastomeric material on the cylindrical drum.

SUMMARY OF THE INVENTION

The Applicant has verified that processes of the same type as disclosed in WO 2008/099236 enable a quality product to be obtained, but with a cycle time that is not always compatible with the production requirements.

The Applicant has then observed that processes of the type described in JP 2005-153348 do not ensure the absence of unevenness in the liner following the shaping step. In fact, detachments between the coils formed with the continuous elongated element can occur in the vicinity of the tyre sidewalls.

The Applicant has subsequently noticed that the deformations suffered by the liner in the sidewall regions of the tyre, while of smaller amount than those generated in the central or axially internal portion corresponding to the radially external or crown region in the shaped tyre, are determined by the combination of a circumferential-stretching action, due to the coil displacement on gradually increasing diameters, and by a forced torsional action due to variation in the orientation of the sidewall regions that, initially parallel to the tyre axis, tend to arrange themselves in substantially radial planes. Consequently, according to the Applicant's perception, the coils, formed with the continuous elongated element initially laid according to an orientation that, seen in cross-section, is substantially parallel to the geometric axis of the drum, tend to rotate as shaping goes on, until they take an orientation almost perpendicular to said geometric axis.

The Applicant has further noticed that, under this situation, the circumferential stretching resulting from the shaping step, even if relatively reduced relative to the stretching that is found in the radially outermost regions of the tyre, tends to determine mutual detachment of the coils formed with the continuous elongated element.

The Applicant has also noticed that, acting on the basis of processes of the same type as illustrated in JP 2005-153348, the opposite circumferential edges of the central portion in the form of a calendered sheet must necessarily be spliced to each other by an end-to-end joint, with suitable mutual overlapping. According to the Applicant, the discontinuity generated in the liner thickness by effect of the joint can cause a corresponding discontinuity in the tyre deformability at the footprint area, which is particularly undesirable as it can be felt during rotation of the tyre on the roadway.

The Applicant has realised that, even when due to some productivity requirements, building of at least one portion of the liner is preferably carried out using a semifinished product previously made and cut to size, the quality requirements of the finished product call for at least one liner portion to be obtained by spiralling of a continuous elongated element of elastomeric material, provided this does not give rise to inconveniences during the shaping step of the tyre being processed.

The Applicant has therefore found that by making the axially external portions of the liner in the form of a continuous sheet, and using spiralling for obtaining the central or axially internal portion of said liner, unexpected advantages are obtained in terms of quality of the product, repeatability of the results and process simplification. Also important advantages can be achieved in terms of reduction in the cycle times and operating versatility relative to production of tyres of different sizes.

In more detail, in a first aspect, the present invention relates to a process for manufacturing tyres, comprising the steps of:
building a carcass structure on a primary drum, said carcass structure comprising a liner, at least one carcass ply and a pair of annular anchoring structures associated with each other, so as to form a substantially cylindrical carcass sleeve;
positioning a crown structure comprising at least one belt structure and a tread band at a radially external position to said carcass structure;
shaping the carcass structure into a toroidal configuration, for associating the crown structure with said carcass structure;
wherein during building of the carcass structure, said liner is applied around an outer surface of the primary drum, by the steps of:
circumferentially winding up at least one pair of sheets of elastomeric material around an outer surface of the primary drum, which sheets are axially spaced apart from each other for making respective axially external portions of the liner;
laying at least one continuous elongated element of elastomeric material in a plurality of mutually approached coils around the outer surface of the primary drum, so as to form a central portion of the liner having axially external edges that are each associated with an axially internal edge of one of said axially external portions of the liner.

The Applicant has verified that manufacture of the axially external portions of the liner in the form of a continuous sheet eliminates the risk of structural discontinuities being generated in the sidewall regions following the shaping step.

In addition, it is the Applicant's opinion that, contrary to what happens in the presence of discontinuities in the axially innermost regions of the tyre, the presence of possible discontinuities due to end-to-end joints at the sidewalls does not determine important repercussions on the quality and behaviour features of the tyre.

The Applicant has then verified that manufacture of the axially external or lateral portions in the form of a continuous semifinished sheet, prepared by calendering for example, allows an important reduction in the cycle times to be achieved, as compared with manufacture of said portions by spiralling.

The Applicant has further noticed that use of spiralling for manufacturing the central or axially internal portion of the liner in turn allows a suitable control on stretching of the coils to be obtained during shaping of the carcass structure, and a satisfactory evenness in the liner thickness in the axially internal region of the finished tyre, at the belt structure. The Applicant could in fact observe that stresses imposed to the coils in the crown region of the tyre during the shaping step exclusively or mainly induce linear stretching deformations that are evenly distributed and/or can be easily controlled.

In addition, use of spiralling for manufacturing the (axially internal) central portion of the liner allows an important process flexibility and adaptability to working of tyres having different sizes to be achieved, without impairing the working times too much.

In a further aspect, the invention relates to a tyre for vehicle wheels comprising:
a carcass structure including at least one carcass ply having end flaps in engagement with respective annular anchoring structures, and a liner extending from one of said annular anchoring structures to the other at a radially internal position to said at least one carcass ply;
a crown structure associated at a radially external position with the carcass structure and including at least one belt structure and a radially external tread band;
wherein said liner has axially external portions each comprising a sheet of elastomeric material extending in the form of a continuous layer, and a central portion having axially external edges each joined to an axially internal edge of one of said axially external portions and formed with at least one continuous elongated element extending in a plurality of mutually approached circumferential coils.

In at least one of the above aspects, the present invention can further have one or more of the preferred features described hereinafter.

The axially external portions of the liner formed on the primary drum preferably have respective axially external flaps carried by respective auxiliary support members, each having a rest surface extending in the continuation of said outer surface of the primary drum.

Preferably, said at least one carcass ply is built on said primary drum by laying of a plurality of strip-like elements disposed circumferentially close to each other.

Use of the auxiliary support members facilitates correct positioning of the axially external portions of the liner and the subsequently formed carcass ply/plies, above all if said at least one carcass ply is obtained by laying of strip-like elements individually applied in mutual circumferentially approached relationship around the primary drum.

Preferably, said auxiliary support members are axially moved apart from the primary drum by axially removing said rest surfaces from the axially external flaps of the axially external portions of the liner.

The absence of coils in the axially external portions of the liner, each obtained from a single sheet wound up in the form of a continuous layer facilitates slipping off of the auxiliary support members without the occurrence of dragging actions, possibly induced by friction, on the axially external portions, that would cause important deformations or structural damages of same.

Preferably, the central portion of the liner is laid on the primary drum subsequently to laying of the axially external portions, so that the axially external edges of the central portion are radially superposed on the respective axially internal edges of said axially external portions.

The coils forming the axially external edges of the central portion thus exert a belting action on the axially external portions of the liner, further stabilising positioning thereof also during axial slipping off of the auxiliary support members.

The axially external portions of the liner formed on the primary drum preferably have respective axially internal flaps supported by respective halves of the primary drum that can be axially moved close to each other.

Preferably, the central portion of the liner is at least partly formed on a central section of the primary drum, slidably engaging said axially approachable halves of the primary drum.

Advantageously, formation of the central portion of the liner by spiralling allows the profile of the outer surface of the primary drum to be followed in an optimal manner, without being adversely affected by the presence of possible surface discontinuities, and consequent variations in the circumferential extension of the outer surface of the drum, above all in the transition regions between the central section and the mutually approachable halves.

The axially external portions of the liner laid on the primary drum preferably have respective axially internal edges mutually spaced apart by an amount greater than the axial size of the central section of the primary drum.

Thus it is avoided that possible surface discontinuities and consequent variations in the circumferential extension of the outer surface of the drum may make it difficult to carry out the correct laying of the axially external portions of the liner through winding of semifinished sheet products.

Preferably, said central portion has an axial extension included between about 25% and about 60% of the overall axial extension of the liner laid on the building drum, before the shaping step.

The above stated parameters cause the axially external portions of the liner to internally cover the obtained tyre over the whole extension of the sidewalls, or a predominant part thereof, restricting the extension of the central portion to the crown region of the tyre alone, that just as an indication corresponds to the width of the belt structure, so as to reduce the cycle time required for manufacture of the central portion through spiralling.

It may be provided that abrasion-proof inserts be integrated into the axially external portions of the liner. Each of said abrasion-proof inserts is preferably made in the form of a strip coupled to the sheet of elastomeric material constituting the respective axially external portion of the liner.

Coupling between the strip and the sheet can be carried out before manufacture of the axially external portions of the liner on the primary drum.

In a possible alternative embodiment, said abrasion-proof inserts are directly made on the primary drum, before laying of the axially external portions of the liner.

Each abrasion-proof insert can be made by laying of at least one respective continuous elongated element of elastomeric material into a plurality of mutually approached coils around the outer surface of the primary drum.

Preferably, building of the carcass structure further comprises the steps of:
 applying at least one carcass ply around the liner formed on the outer surface of the primary drum;
 fitting a pair of annular anchoring structures around axially opposite end flaps of the carcass ply,
wherein said annular anchoring structures define a fitting diameter smaller than an application diameter defined by the outer surface of the primary drum.

Laying of the plies according to an application diameter greater than the fitting diameter produces a considerable reduction in the deformations imposed to the liner to make it radially expand until coupling of the carcass structure to the crown structure is achieved, during the shaping step. The Applicant has found that it is thus possible to achieve more evenness and thickness uniformity of the liner, also in the axially internal regions, this effect being particularly apparent in low-section tyres for high and ultra-high performance (it is the Applicant's opinion that this effect is also present in tyres that are not of the low-section type, although therein it can be detected to a lower extent).

At the end of this shaping step, said tyre preferably has a section height, measured between a radially outermost point of the crown structure and the radially innermost point of a bead, included between about 20% and about 50% of a section width, axially measured at a point of maximum chord of the tyre.

The Applicant has in particular observed that in such low-section tyres the percent difference between the final diameter of the tyre at the end of the shaping step (corresponding to the diameter of the crown structure) and the fitting diameter is significantly smaller than the same difference in tyres that are not of the low-section type, which allows an optimal uniformity in the liner structure to be obtained also if said liner is built by spiralling in its central (axially internal) portion.

According to a further preferred embodiment, an application diameter defined by said outer surface is included between about 102% and about 120% of a fitting diameter defined by said annular anchoring structures.

In a tyre to be manufactured in accordance with the present invention the central portion of the liner preferably has a linear extension, measured in a section plane radial to the tyre axis, included between about 25% and about 60% of the overall linear extension of the liner.

The central portion of the liner preferably extends at least over the whole axial extension of said belt structure.

Each of said axially external portions preferably extends until close to the crown structure.

Preferably, each of said axially external portions extends until close to a respective edge of at least one belt layer of said belt structure.

It is also preferably provided that each of said axially external portions should cover the whole extension of a respective sidewall extending from the respective annular anchoring structure to an edge of said tread band, externally of said at least one carcass ply.

A tyre in accordance with a preferred embodiment further comprises abrasion-proof inserts integrated into the axially external portions of the liner. Each of said abrasion-proof inserts is preferably made in the form of a strip coupled to the sheet of elastomeric material constituting the respective axially external portion of the liner.

According to a possible alternative embodiment, each abrasion-proof insert comprises at least one respective continuous elongated element of elastomeric material, extending in the form of a plurality of mutually-approached circumferential coils.

Further features and advantages will become more apparent from the detailed description of a preferred but not exclusive embodiment of a process for manufacturing a tyre and of a tyre obtained by said process, in accordance with the present invention.

BRIEF DESCRIPTION OF THE DRAWINGS

This description will be set out hereinafter with reference to the accompanying drawings, given by way of non-limiting example, in which.

DETAILED DESCRIPTION OF THE INVENTION

With reference to the drawings, an apparatus for manufacturing tyres for vehicle wheels, provided for carrying out a method according to the present invention has been generally identified by reference numeral 1.

Figure 5:
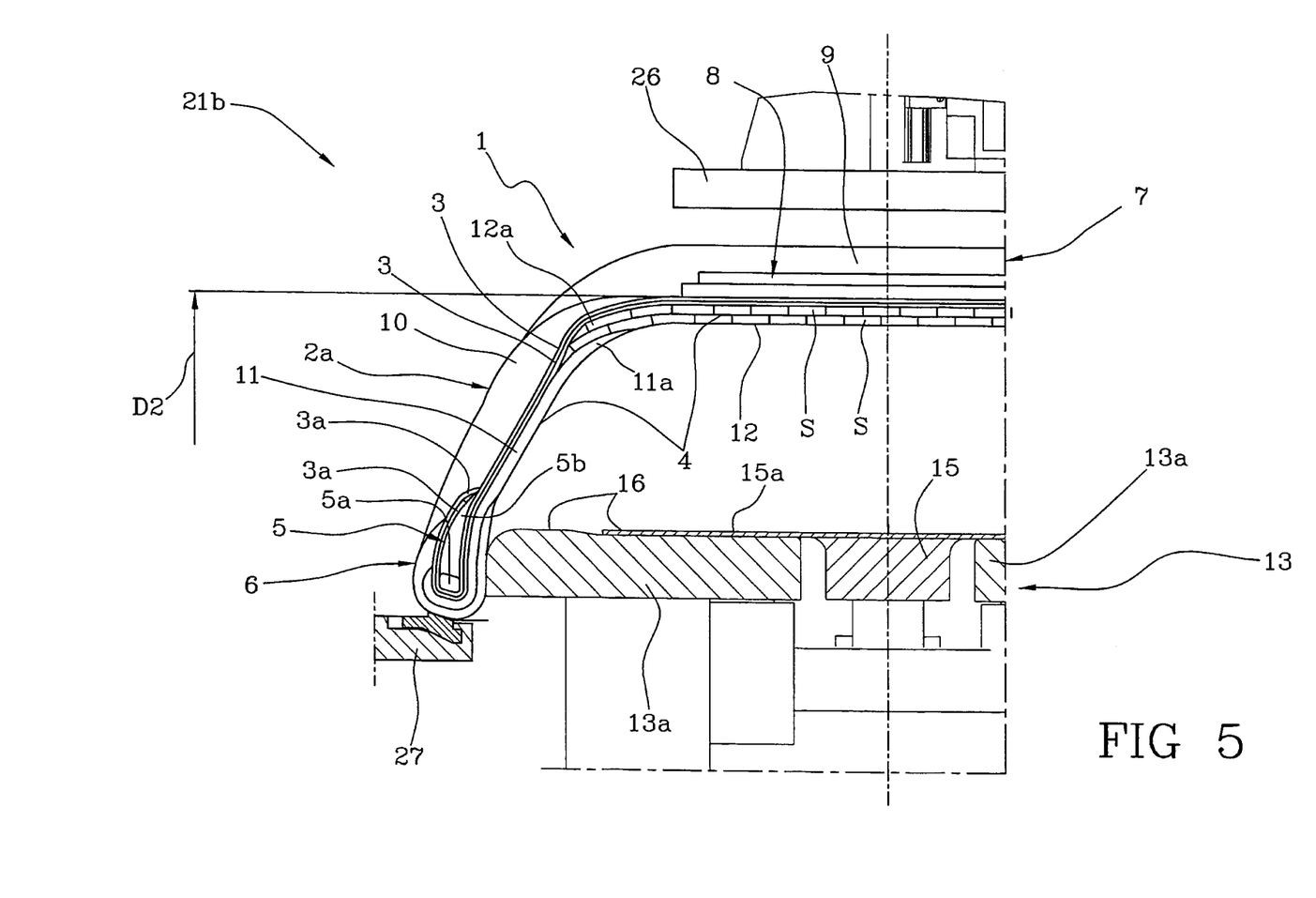
FIG. 5 shows a tyre under processing in the step during which the carcass sleeve is shaped for application thereto of an outer crown structure.

Apparatus 1 is intended for manufacturing tyres 2 (FIG. 5) essentially comprising at least one carcass ply 3 internally coated with a layer of an impermeable elastomeric material or a so-called liner 4. Two annular anchoring structures 5, each comprising a so-called bead core 5a carrying an elastomeric filler 5B at a radially external position are engaged to respective end flaps 3a of the carcass ply or plies 3. The annular anchoring structures 5, concentric with a geometric axis X-X of tyre 2, are integrated close to regions usually identified as "beads" 6, at which engagement between the tyre and a respective mounting rim (not shown) occurs, according to a fitting diameter D0 determined by the inner diametrical sizes of the annular anchoring structures 5. Carcass ply/plies 3, liner 4 and annular anchoring structures 5 altogether form a so-called carcass structure identified on the whole with 2a in FIG. 5.

A crown structure 7 is circumferentially applied around the carcass ply/plies 3. Said crown structure 7 comprises a belt structure 8, only diagrammatically shown in FIG. 5, and a tread band 9 radially overlapping the belt structure 7. The belt structure, only diagrammatically shown in the figures, is for example formed with one or more belt layers each comprising metallic and/or textile cords disposed parallel to each other and with a crossed orientation relative to the cords belonging to the possible adjacent belt layer. At least one of the belt layers may be provided to comprise textile or metallic cords wound up into coils extending in the circumferential extension direction of the tyre and arranged in axial side by side relationship relative to each other.

Two sidewalls 10, each extending from the corresponding bead 6 to a corresponding side edge of the tread band 9, are applied at laterally opposite positions to the carcass ply/plies 3.

Liner 4, extending from one of the annular anchoring structures 5 to the other, has axially external portions 11 each comprising at least one sheet of elastomeric material extending in the form of a continuous layer, and a central portion 12 having axially external edges 12a each joined to an axially internal edge 11a of one of said axially external portions 11.

The central portion 12 is formed with at least one continuous elongated element extending in the form of a plurality of mutually approached circumferential coils S. Mutual approaching of the coils S forming the central portion 12 can take place concurrently with partial overlapping between mutually adjacent coils, to a more or less important extent starting from a zero value, to which a mutual approaching in the axial direction corresponds, i.e. in an extension direction parallel to the geometric axis of the tyre, until a maximum value corresponding to radial approaching of coils S.

The overlapping amount between a zero value and a maximum value can be modulated depending on requirements, so as to obtain the central portion 12 in the form of a uniform layer of the desired thickness.

Apparatus 1 comprises a primary drum 13 having two halves 13a supported by a central shaft 14 extending along a geometric axis of the primary drum 13, coincident with the geometric axis X-X of the tyre to be manufactured. Halves 13a of the primary drum 13 are simultaneously movable in respectively opposite directions along the central shaft 14, by means of devices that are not described as they can be made in a manner known by itself.

The primary drum 13 can further comprise a central section 15 slidably engaging halves 13a and substantially extending in surface continuity relationship relative thereto. In the example shown, the central section 15 has two cylindrical tubular extensions 15a axially extending in opposite directions, into each of which one of halves 13a of the primary drum 13 is slidably introduced so as to define with the latter, at a radially external position, a substantially continuous outer surface 16, possibly with the presence of a difference in height to be measured between the central section 15 and each of said halves 13a, due to a diameter variation caused by the thickness of the cylindrical tubular extensions 15a.

In accordance with a possible alternative embodiment not shown, halves 13a of the primary drum 13 can axially extend towards each other with respective mutually penetrating sets of teeth, i.e. wherein the teeth of each set are slidably fitted in an alternated sequence between the teeth belonging to the other half 13a, so as to give the outer surface 16 a substantial continuity.

Each of halves 13a and the central section 15 are made up of respective circumferential sectors that are radially movable between a rest condition (not shown) in which they are disposed radially close to the geometric axis X-X to give the primary drum 13 a diametrical bulkiness smaller than the fitting diameter D0 of the tyre under processing, in order to enable removal of the built tyre 2 from the primary drum 13, and a work condition in which, as shown in the drawings, they extend in a circumferential continuity relationship so as to form the so-called outer surface 16 defining an application diameter D1 preferably greater than the fitting diameter D0.

In the example shown, the radial movement of the circumferential sectors is carried out through a plurality of connecting rods 17 each linked between one of the sectors of the central section 15 of the primary drum 13 and a drive collar 18 rotatably carried by the central shaft 14 and drivable in angular rotation through an outer actuator (not shown).

By transmission bars 19 axially extending through the sectors of the central section 15, the radial movements of the latter are transmitted to the circumferential sectors of the axially opposite halves 13a of the primary drum 13, being slidably guided along respective columns 20 radially extending relative to the central shaft 14.

The primary drum 13 is adapted to be transferred, by at least one robotized arm (not shown) or transfer devices of other type operating on at least one grip end 14a provided on the central shaft 14, to one or more work stations 21a, 21b, to enable different working steps aiming at assembling the tyre 2 under processing to be carried out.

Figure 1:
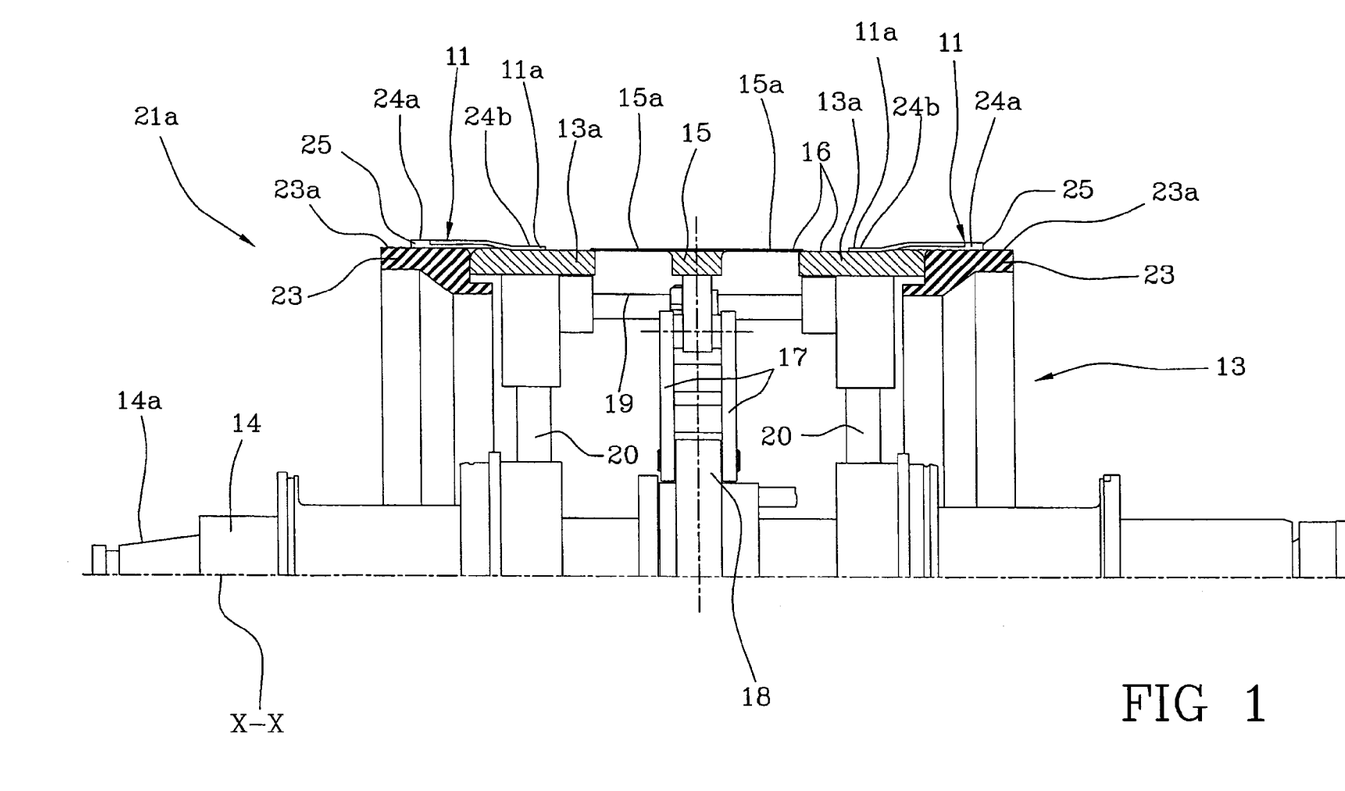
FIG. 1 is a diagrammatic diametrical section view of a step of manufacturing the liner around a primary drum.
Figure 2:
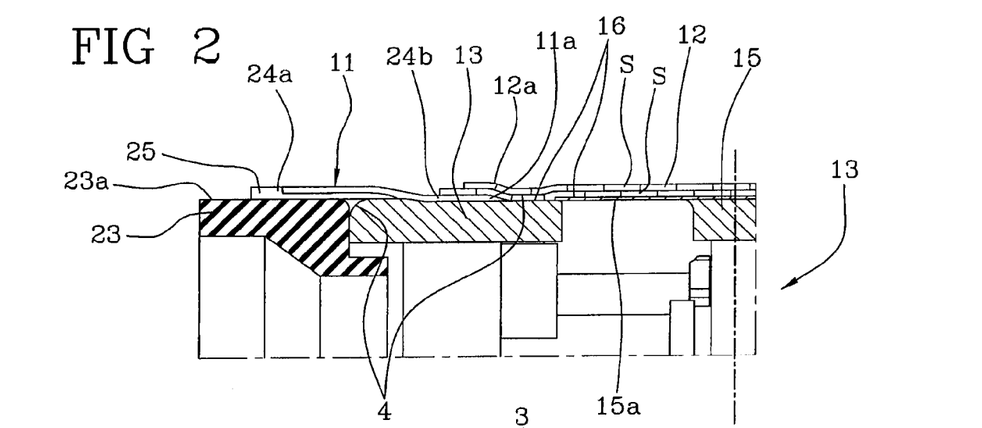
FIG. 2 is a diagrammatic diametrical section view of a liner-manufacturing step following the one in FIG. 1.
Figure 3:
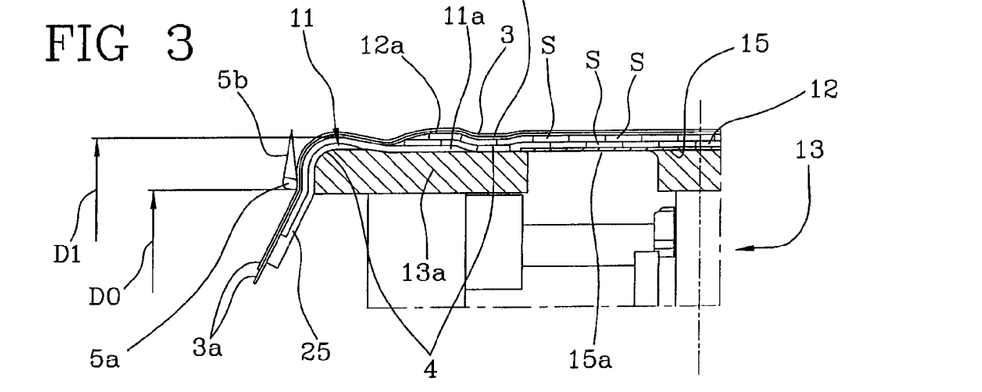
FIG. 3 shows a step in which annular anchoring structures are coaxially fitted on respective end flaps of at least one carcass ply previously laid on the primary drum.
Figure 4:
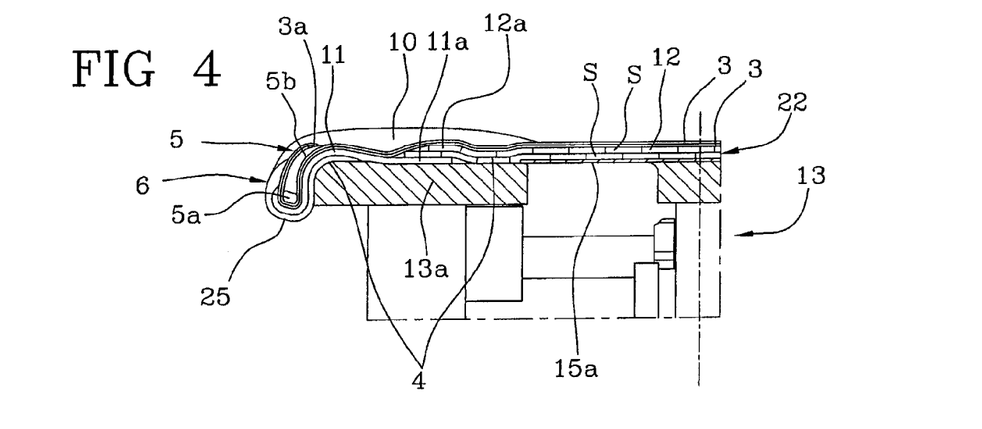
FIG. 4 shows a step in which application of a pair of sidewalls has occurred onto the carcass sleeve supported by the primary drum.

More particularly, the primary drum 13 is first engaged in a building station 21a (FIGS. 1 and 4) in which a so-called carcass sleeve 22 is made which comprises the carcass ply/plies 3 coupled to the respective annular anchoring structures 5.

In the building station 21a, the primary drum 13 is preferably equipped with auxiliary support members 23, for example made in the form of two annular elements that can be removably approached on sides axially opposite to the main drum 13. The auxiliary support members 23 have respective rest surfaces 23a preferably having a substantially cylindrical conformation with substantially the same diameter as the application diameter D1. When approaching has occurred, the auxiliary support members 23 form an integral part of the primary drum 13, the rest surfaces 23a being disposed in continuity relationship in the extension of the outer surface 16.

Forming devices for liner 4—not shown as they can be made in known manner—operate in the building station 21a for application of liner 4 around the outer surface 16 of the primary drum 13. In more detail, the liner-forming device can for example comprise one or more feeding units for supply of a pair of sheets of raw elastomeric material at locations axially spaced apart from each other. Each sheet, preferably obtained from a semifinished product in the form of a continuous strip cut to a length substantially corresponding to the circumferential extension of the outer surface 16 of the primary drum 13, is wound around said outer surface. Winding is preferably carried out through rotation of the primary drum 13 around its geometric axis, until leading the opposite ends of each sheet to mutually mate, so that they can be spliced possibly with slight mutual overlapping.

The sheets applied onto the primary drum 13 define the axially external portions 11 of liner 4, preferably disposed at least partly on each of the respective auxiliary support members 23. More particularly, each of the axially external portions 11 has at least one axially external flap 24a carried by one of the auxiliary support members 23. Preferably, each of the axially external portions 22 of liner 4 further has an axially internal flap 24b projecting beyond the respective auxiliary support member 23 on the outer surface 16 of the primary drum 13, on the respective half 13a thereof. In more detail, the axially internal edges 11a of the axially external portions 11 of liner 4 are preferably spaced apart from each other to a greater extent than the axial size of the central section 15 of the primary drum 13. In this manner possible surface discontinuities between the central section 15 and halves 13a of the primary drum 13 are prevented from conditioning the laying speed and accuracy of the axially external portions 11 of liner 4.

The liner-forming devices operating in the building station 21a can also comprise at least one dispensing device designed to feed at least one continuous elongated element of raw elastomeric material for manufacturing the central portion 12 of liner 4 by an operation referred to as "spiralling". According to the spiralling operation, the continuous elongated element coming from the dispensing device, an extruder for example, is laid on the outer surface 16 of the primary drum 13, while the latter is being driven in rotation around the geometric axis X-X and suitably moved in front of the dispensing device so as to form the aforesaid coils S that are mutually approached to define the central portion 12 of liner 4.

Movement of the primary drum 13 in front of the dispensing device can be easily programmed and controlled so as to give the central portion 12 desired geometrical features, particularly in terms of thickness and axial extension, varying each time depending on requirements.

In particular, the axial extension of the central portion 12 can be easily determined as a function of the axial distance between the axially internal edges 11a of the axially external portions 11 of liner 4. This distance in turn can vary as a function of the distance existing between the halves 13a of the primary drum 13, established beforehand and susceptible of modification depending on the size of tyre 2 being processed.

Manufacture of the central portion 12 by spiralling therefore allows an important operating flexibility in terms of adaptation of the working process to different tyre sizes, without apparatus or machinery replacement being required.

Preferably, the central portion 12 has an axial extension included, just as an indication, between about 25% and about 60% of the overall axial extension of liner 4 laid on the building drum.

The central portion 12 is mainly formed on the central section 15 and preferably protrudes therefrom by its axially external edges 12a, disposed on the respective halves 13a of the primary drum 13. During laying of the continuous elongated element, the individual coils S formed by said element spontaneously fit the conformation of the outer surface 16 of the primary drum 13, following possible diametrical variations due to the thickness of the cylindrical tubular extensions 15a, and/or other possible discontinuities.

Preferably, the central portion 12 of liner 4 is laid on the primary drum 13 after laying of the axially external portions 11. The axially external edges 12a of the central portion 12 appear to radially overlap the respective axially internal edges 11a of said axially external portions 11. The axially external portions 11 are therefore stabilised against the halves 13a of the primary drum 13, due to the belting action exerted by the coils S forming the axially external edges 12a of the central portion 12.

If necessary, abrasion-proof inserts 25 to be incorporated into beads 6 of tyre 2 can be integrated into the axially external portions 11 of liner 4.

These abrasion-proof inserts 25 for example can be made in the form of a strip that, by extrusion and/or calendering, will be coupled to the semifinished product in the form of a sheet from which the axially external portions 11 will be obtained. Laying of the axially external portions 11 will be carried out in a manner enabling the abrasion-proof inserts 25 to be located at a radially internal position, so as to be exposed on the radially internal surface of beads 6 of the obtained tyre 2.

Alternatively, the abrasion-proof inserts 25 can be directly made on the auxiliary support members 23 and/or on halves 13a of the primary drum 13, before laying of the axially external portions 11 of liner 4.

In this case, each abrasion-proof insert 25 can be either made in the form of a sheet cut from a semifinished product in the form of a continuous strip, in the same manner as described with reference to the axially external portions 11 of liner 4, or made through spiralling of a continuous elongated element, in the same manner as described with reference to the central portion 12 of liner 4.

In manufacturing tyres of the self-supporting type (the so-called run-flat tyres) the building station 21a can be also equipped with auxiliary devices designed to form, before and/or after manufacturing liner 4, auxiliary support inserts of elastomeric material (the so-called sidewall inserts) applied to the rest surfaces 23a and/or the halves 13a of the primary drum 13, so as to be then incorporated into tyre 2 at the sidewall 10 region.

Subsequently to formation of liner 4 and/or other possible additional components of the tyre under processing, devices not shown as they can be made in any convenient manner, apply the carcass ply/plies 3 around the outer surface 16, according to said application diameter D1.

Each carcass ply 3 can consist of an article of manufacture in the form of a continuous strip previously cut according to the circumferential extension of the outer surface 16 and supplied to the latter, while the primary drum 13 is rotating around its geometric axis X-X, so as to determine winding thereof around the outer surface 16.

In a preferred embodiment, the application devices comprise members for sequentially applying a plurality of strip-like elements disposed transversely relative to the circumferential extension of the outer surface 16, while the primary drum 13 is being driven in rotation, in a stepping way, in the same manner as for instance described in document U.S. Pat. No. 6,328,084 in the name of the same Applicant.

Thus the carcass ply/plies 3 are directly formed on the primary drum 13, using strip-like elements applied in mutually approached relationship so as to cover the whole circumferential extension of the outer surface 16.

Preferably, the outer surface 16 has an axial size smaller than the width of said at least one carcass ply 3, so that the end flaps 3a of the carcass ply/plies 3 disposed on the primary drum 13 axially protrude from the opposite ends of the outer surface 16 and are at least partly supported by the aforesaid rest surfaces 23a.

When formation of the carcass ply/plies 3 has been completed, the auxiliary support members 23 are axially moved away from the respective halves 13a of the primary drum 13, so as to cause slipping off of the rest surfaces 23a from liner 4 and from the carcass ply/plies 3.

Removal of the auxiliary support members 23 is facilitated by the structural compactness of the axially external portions 11 of liner 4, each comprising a sheet laid in the form of a continuous layer around the respective auxiliary support member 23. These axially external portions 11 stabilise the mutual constraints between the components laid on the primary drum 13 hindering disengagement or mutual movement of same, by effect of a dragging action induced by removal of the auxiliary support members 23. In this regard, the axially external portions 11 can carry out a stabilisation and mutual constraint action also on other components adjacent to said portions, such as abrasion-proof inserts 25 and/or sidewall inserts, possibly obtained by spiralling.

Removal of the auxiliary support members 23 makes it possible to fold towards the geometric axis X-X of the primary drum 13, the end flaps 3a of the carcass ply/plies 3 applied around the primary drum 13, for example with the aid of rollers or other devices not shown as they can be made in any convenient manner.

Locating members not shown as they can be made in known manner, carry out fitting of each of the annular anchoring structure 5 coaxially around one of the end flaps 3a of the carcass ply/plies 3 folded up towards the geometric axis X-X. The inner diameter of the annular anchoring structures 5 defining said fitting diameter D0 is preferably smaller than the diameter of the outer surface 16 substantially defining the application diameter D1 of the semifinished products or the elementary components of the tyre under processing. Consequently, the annular anchoring structures 5 fitted on the end flaps 3a are adapted to be located in axial abutment relationship, each against the corresponding half 13a of the primary drum 13.

When location has been completed, inflatable bladders or other turning up members (not shown) carry out turning up of each of the end flaps 3a around the respective annular anchoring structure 5, so as to stabilise engagement of said structure 5 with the carcass ply 3 causing formation of said carcass sleeve 22.

When engagement of the annular anchoring structures 5 has been completed, laying of at least one portion of the sidewalls 10 can be carried out.

The primary drum 13 carrying the carcass sleeve 22 is then transferred from the building station 21a to a shaping station 21b (FIG. 5) to receive in engagement the crown structure 7 integrating the belt structure 8 preferably already coupled to the tread band 9 and possibly also to another portion of the sidewalls 10.

The crown structure 7 can be previously prepared by formation or winding of one or more belt layers adapted to make the belt structure 8 on an auxiliary drum (not shown), and subsequent winding of the tread band 9 on the belt structure 8 carried by the auxiliary drum. The crown structure 7 thus formed lends itself to be removed from the auxiliary drum, by a transfer ring 26 for example or other suitable devices that will then transfer it to the shaping station 21b in order to set it in position, coaxially centred around the carcass sleeve 22 carried by the primary drum 13.

Operating in the shaping station 21b are shaping devices acting on the primary drum 13 to shape the carcass sleeve 22 into a toroidal configuration (FIG. 5), so as to determine application thereof against a radially internal surface of the crown structure 7.

The shaping devices can for instance operate in such a manner as to cause mutual axial approaching of halves 13a of the primary drum 13 and, consequently, of the annular anchoring structures 5 of the carcass sleeve 22, possibly concurrently with admission of air or other operating fluid into the carcass sleeve 22 so as to determine radial expansion of same by inflation, during mutual approaching of the annular anchoring structures 5, preferably retained against the primary drum 13 by respective locking members 27.

When shaping is over, the central portion 12 of liner 4 has a linear extension, measured in a section plane radial to the tyre 2 axis, included between about 25% and about 60% of the overall linear extension of the liner itself. The linear extension of the central portion 12, and consequently of the axially external portions 11 of liner 4, are preferably such selected that the central portion 12 of liner 4 extends as far as the crown region alone of tyre 2, just as an indication subtended by the full axial extension that can be detected between the axially opposite edges of the belt structure 8.

In turn, the axially external portions 11 each extend away from the respective bead 6 until close to the crown structure 7, preferably over the whole extension of the respective sidewall 10, or a prevailing part of same, until close to the respective edge of the belt structure 8.

The limited extension of the spiralled central portion 12 that only concerns the crown region of tyre 2 allows the cycle time required for formation of the central portion 12 by spiralling to be reduced, which time is basically longer than that required for laying of the axially external portions 11 through winding of semifinished products in the form of a strip.

In addition, following shaping of the carcass sleeve 22, the central portion 12 of liner 4 is forced to expand starting from the application diameter until sizes equal to an inner diameter D2 of the belt structure 8 are reached. The circumferential coils S forming the central portion 12 lend themselves to follow this expansion being almost exclusively submitted to longitudinal-stretching deformations, that can be easily foreseen and controlled with high repeatability of the results.

The deformations induced to the axially external portions 11 of liner 4, on the contrary, are of a more complex nature than those imposed to the central portion 12. In fact, on occurrence of a circumferential stretching of a progressively increasing amount on moving away from beads 6, a variation takes place in the orientation of the deformations around the respective annular anchoring structures 5.

Complex stresses of this type that could cause hardly controllable deformations in a spiralled structure like that of the central portion 12 of liner 4 can be better followed by the more compact and structurally more homogeneous side portions 11 comprising a sheet in the form of a continuous layer.

Laying of liner 4 and of the carcass ply/plies 3 on the primary drum 13 according to an application diameter D1 greater than the fitting diameter D0 defined by the annular anchoring structures 5 also allows the deformations suffered by liner 4 during the shaping step to be greatly limited.

These more reduced deformations result in smaller stretching deformations induced to the central portion 12 and to the axially external portions 11 of liner 4, particularly close to their radially external regions when shaping has been completed.

In taking advantage of the benefits of the present invention to the best, a person skilled in the art will be able to experience, within the preferred values, those expressed relatively to the application diameter D1, paying attention that they must be intended as average values measured between the radially innermost surface and the radially outermost surface of the assembly of the carcass plies 3.

The Applicant has found that it is preferable for the application diameter D1 to be included between about 102% and about 120%, most preferably between about 105% and about 115%, of the fitting diameter D0.

In a preferred embodiment of the process of the invention, the application diameter D1 is included between about 30% and about 90%, most preferably between about 50% and about 80%, of the inner diameter D2 of the crown structure 7.

It is also preferable that the difference between the application diameter D1 and the fitting diameter D0 be included between about 2% and about 70%, more preferably between about 20% and about 50%, of the difference between the inner diameter D2 of the crown structure and the fitting diameter D0.

To the aims of the present invention, use of the process and apparatus according to the invention for producing low-section tyres for high and ultra-high performance is preferred, which tyres have a section height measured between a radially outermost point of the crown structure 7 and the radially innermost point of a bead 6 included between about 20% and about 50% of a section width axially measured at a point of maximum chord, i.e. of maximum width measurable in parallel to the rotation axis X-X of tyre 2.

In fact, since in these low-section tyres the difference between the final diameter of the carcass sleeve 22 at the end of the shaping step (corresponding to the diameter of the crown structure 7) and the fitting diameter D0 is relatively reduced, the decrease in the difference between the final shaping diameter (corresponding to D2) and the application diameter D1 allows stresses induced to liner 4 following the shaping step to be further reduced.

When building has been completed, tyre 2 can be removed from the primary drum 13 after radial contraction of the latter, to be then submitted to a vulcanisation step to be carried out in any convenient manner.

The invention claimed is:

1. A process for manufacturing tyres, the process comprising:
    building a carcass structure on a primary drum, the carcass structure comprising a liner, at least one carcass ply and a pair of annular anchoring structures associated with each other so as to form a substantially cylindrical carcass sleeve;
    positioning a crown structure comprising at least one belt structure and a tread band at a radially external position to said carcass structure; and
    shaping the carcass structure into a toroidal configuration, for associating the crown structure with said carcass structure,
    wherein during building of the carcass structure, said liner is applied around an outer surface of the primary drum by:
        circumferentially winding up at least one pair of sheets of elastomeric material around an outer surface of the primary drum, said sheets being axially spaced apart from each other for making respective axially external portions of the liner; and
        laying at least one continuous elongated element of elastomeric material in the form of a plurality of mutually approached coils around the outer surface of the primary drum so as to form a central portion of the liner having axially external edges that are each associated with an axially internal edge of one of said axially external portions of the liner;
    wherein abrasion-proof inserts are integrated into the axially external portions of the liner;
    wherein each of said abrasion-proof inserts is made in a form of a strip coupled to the sheet of elastomeric material comprising the respective axially external portion of the liner; and
    wherein coupling between said strip and said sheet is carried out before manufacture of the axially external portions of the liner on the primary drum.

2. The process as claimed in claim 1, wherein:
    the axially external portions of the liner formed on the primary drum have respective axially internal flaps carried by a central section of the primary drum and respective axially external flaps carried by respective auxiliary support members, each having a rest surface extending in a continuation of said outer surface of the primary drum.

3. The process as claimed in claim 2, further comprising axially moving said auxiliary support members away from the primary drum by axially removing the rest surfaces from the axially external flaps of the axially external portions of the liner.

4. The process as claimed in claim 2, wherein the central portion of the liner is laid on the primary drum subsequent to laying of the axially external portions, so that the axially external edges of the central portion are radially superposed on respective axially internal edges of the axially internal flaps of said axially external portions.

5. The process as claimed in claim 2, wherein the axially external portions of the liner formed on the primary drum have respective axially internal edges of the axially internal flaps supported by respective halves of the primary drum that can be axially moved close to each other.

6. The process as claimed in claim 2, wherein the central portion of the liner is at least partly formed on the central section of the primary drum, slidably engaging axially approachable halves of the primary drum.

7. The process as claimed in claim 6, wherein respective axially internal edges of the axially internal flaps are mutually spaced apart by an amount greater than an axial size of the central section of the primary drum.

8. The process as claimed in claim 1, wherein said at least one carcass ply is built on said primary drum by laying of a plurality of strip like elements disposed circumferentially close to each other.

9. The process as claimed in claim 1, wherein said central portion has an axial extension between about 25% and about 60% of an overall axial extension of the liner laid on the building drum before shaping the carcass structure into the toroidal configuration.

10. The process as claimed in claim 1, wherein building of the carcass structure further comprises:
    applying the at least one carcass ply around the liner formed on the outer surface of the primary drum; and
    fitting the pair of annular anchoring structures around axially opposite end flaps of the carcass ply,
    wherein said annular anchoring structures define a fitting diameter smaller than an application diameter defined by the outer surface of the primary drum.

11. The process as claimed in claim 1, wherein at the end of shaping the carcass structure into the toroidal configuration, said tyre has a section height, measured between a radially outermost point of the crown structure and the radially innermost point of a bead between about 20% and about 50% of a section width, axially measured at a point of maximum chord of the tyre.

12. The process as claimed in claim 1, wherein an application diameter defined by said outer surface is between about 102% and about 120% of a fitting diameter defined by said annular anchoring structures.

13. The process as claimed in claim 1, wherein the central portion of the liner is extended at least over a whole axial extension of said at least one belt structure.

14. The process as claimed in claim 1, wherein the central portion of the liner is provided with a linear extension, measured in a section plane radial to a tyre axis, between about 25% and about 60% of an overall linear extension of the liner.

15. The process as claimed in claim 1, wherein each of said axially external portions is extended until close to the crown structure.

16. The process as claimed in claim 1, wherein each of said axially external portions is extended until close to a respective edge of at least one belt layer of said at least one belt structure.

17. The process as claimed in claim 1, wherein each of said axially external portions covers a whole extension of a respective sidewall extending from a respective annular anchoring structure to an edge of said tread band, externally of said at least one carcass ply.

18. A process for manufacturing tyres, the process comprising:
building a carcass structure on a primary drum, the carcass structure comprising a liner, at least one carcass ply and a pair of annular anchoring structures associated with each other so as to form a substantially cylindrical carcass sleeve;
positioning a crown structure comprising at least one belt structure and a tread band at a radially external position to said carcass structure; and
shaping the carcass structure into a toroidal configuration, for associating the crown structure with said carcass structure,
wherein during building of the carcass structure, said liner is applied around an outer surface of the primary drum by:
circumferentially winding up at least one pair of sheets of elastomeric material around an outer surface of the primary drum, said sheets being axially spaced apart from each other for making respective axially external portions of the liner; and
laying at least one continuous elongated element of elastomeric material in the form of a plurality of mutually approached coils around the outer surface of the primary drum so as to form a central portion of the liner having axially external edges that are each associated with an axially internal edge of one of said axially external portions of the liner;
wherein abrasion-proof inserts are integrated into the axially external portions of the liner; and
wherein said abrasion-proof inserts are directly manufactured on the primary drum before laying of the axially external portions of the liner.

19. The process as claimed in claim 18, wherein each abrasion-proof insert is made by laying of at least one continuous elongated element of elastomeric material into a plurality of mutually approached coils around the outer surface of the primary drum.

20. The process as claimed in claim 18, wherein the axially external portions of the liner formed on the primary drum have respective axially internal flaps carried by a central section of the primary drum and respective axially external flaps carried by respective auxiliary support members, each having a rest surface extending in a continuation of said outer surface of the primary drum.

21. The process as claimed in claim 20, further comprising axially moving said auxiliary support members away from the primary drum by axially removing the rest surfaces from the axially external flaps of the axially external portions of the liner.

22. The process as claimed in claim 20, wherein the central portion of the liner is laid on the primary drum subsequent to laying of the axially external portions, so that the axially external edges of the central portion are radially superposed on respective axially internal edges of the axially internal flaps of said axially external portions.

23. The process as claimed in claim 20, wherein the axially external portions of the liner formed on the primary drum have respective axially internal edges of the axially internal flaps supported by respective halves of the primary drum that can be axially moved close to each other.

24. The process as claimed in claim 20, wherein the central portion of the liner is at least partly formed on the central section of the primary drum, slidably engaging axially approachable halves of the primary drum.

25. The process as claimed in claim 24, wherein respective axially internal edges of the axially internal flaps are mutually spaced apart by an amount greater than an axial size of the central section of the primary drum.

26. The process as claimed in claim 18, wherein said at least one carcass ply is built on said primary drum by laying of a plurality of strip-like elements disposed circumferentially close to each other.

27. The process as claimed in claim 18, wherein said central portion has an axial extension between about 25% and about 60% of an overall axial extension of the liner laid on the building drum before shaping the carcass structure into the toroidal configuration.

28. The process as claimed in claim 18, wherein building of the carcass structure further comprises:
applying the at least one carcass ply around the liner formed on the outer surface of the primary drum; and
fitting the pair of annular anchoring structures around axially opposite end flaps of the carcass ply,
wherein said annular anchoring structures define a fitting diameter smaller than an application diameter defined by the outer surface of the primary drum.

29. The process as claimed in claim 18, wherein at the end of shaping the carcass structure into the toroidal configuration, said tyre has a section height, measured between a radially outermost point of the crown structure and the radially innermost point of a bead between about 20% and about 50% of a section width, axially measured at a point of maximum chord of the tyre.

30. The process as claimed in claim 18, wherein an application diameter defined by said outer surface is between about 102% and about 120% of a fitting diameter defined by said annular anchoring structures.

31. The process as claimed in claim 18, wherein the central portion of the liner is extended at least over a whole axial extension of said at least one belt structure.

32. The process as claimed in claim 18, wherein the central portion of the liner is provided with a linear extension, measured in a section plane radial to a tyre axis, between about 25% and about 60% of an overall linear extension of the liner.

33. The process as claimed in claim 18, wherein each of said axially external portions is extended until close to the crown structure.

34. The process as claimed in claim 18, wherein each of said axially external portions is extended until close to a respective edge of at least one belt layer of said at least one belt structure.

35. The process as claimed in claim 18, wherein each of said axially external portions covers a whole extension of a respective sidewall extending from a respective annular anchoring structure to an edge of said tread band, externally of said at least one carcass ply.

* * * * *